Dec. 5, 1939.  C. E. STAINBROOK  2,182,215
BAKING PAN
Filed Oct. 21, 1937  2 Sheets-Sheet 1
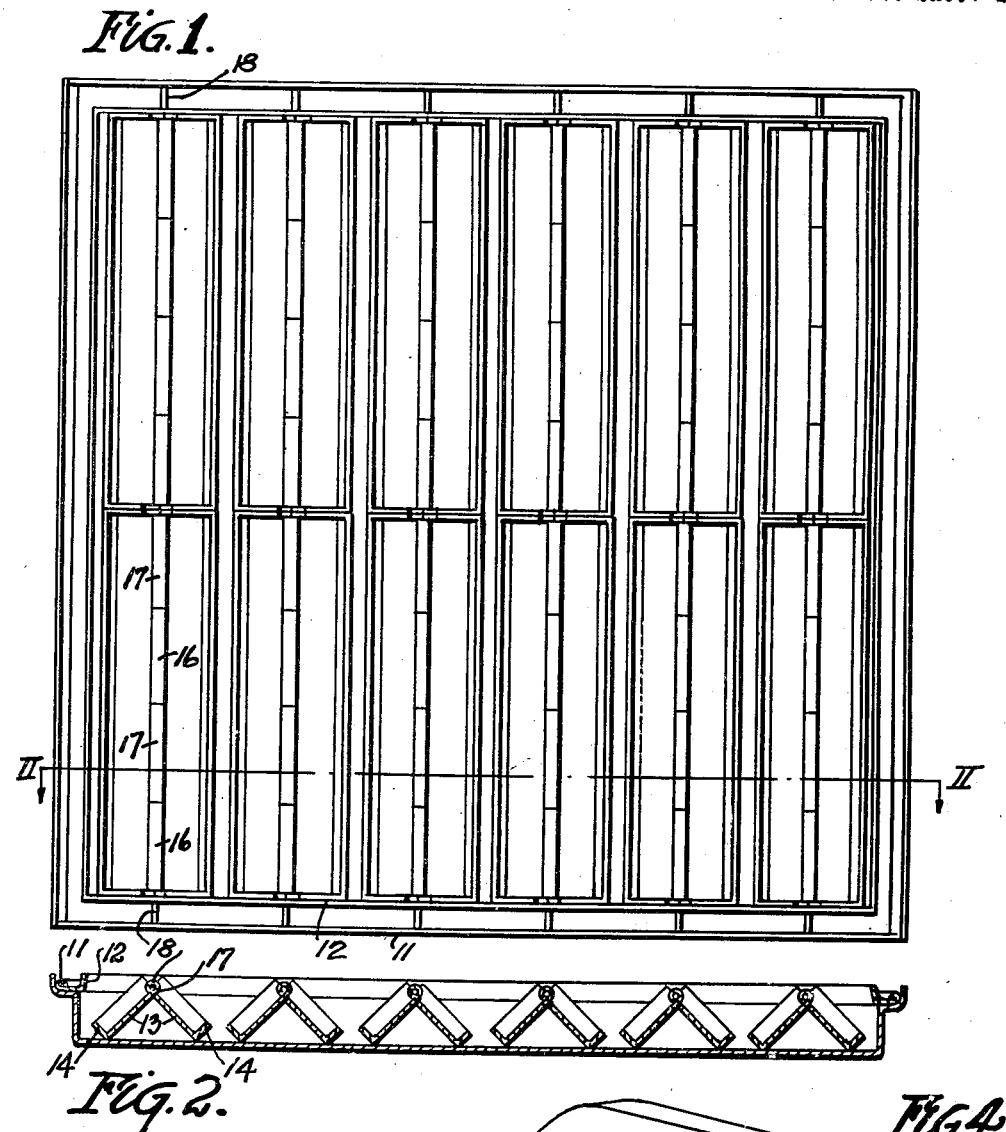
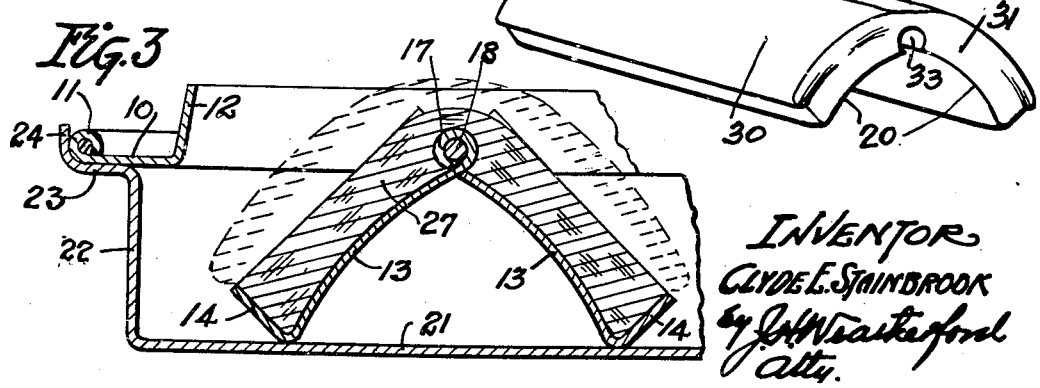
INVENTOR
CLYDE E. STAINBROOK
By J H Weatherford
Atty.

Dec. 5, 1939.   C. E. STAINBROOK   2,182,215
BAKING PAN
Filed Oct. 21, 1937   2 Sheets-Sheet 2
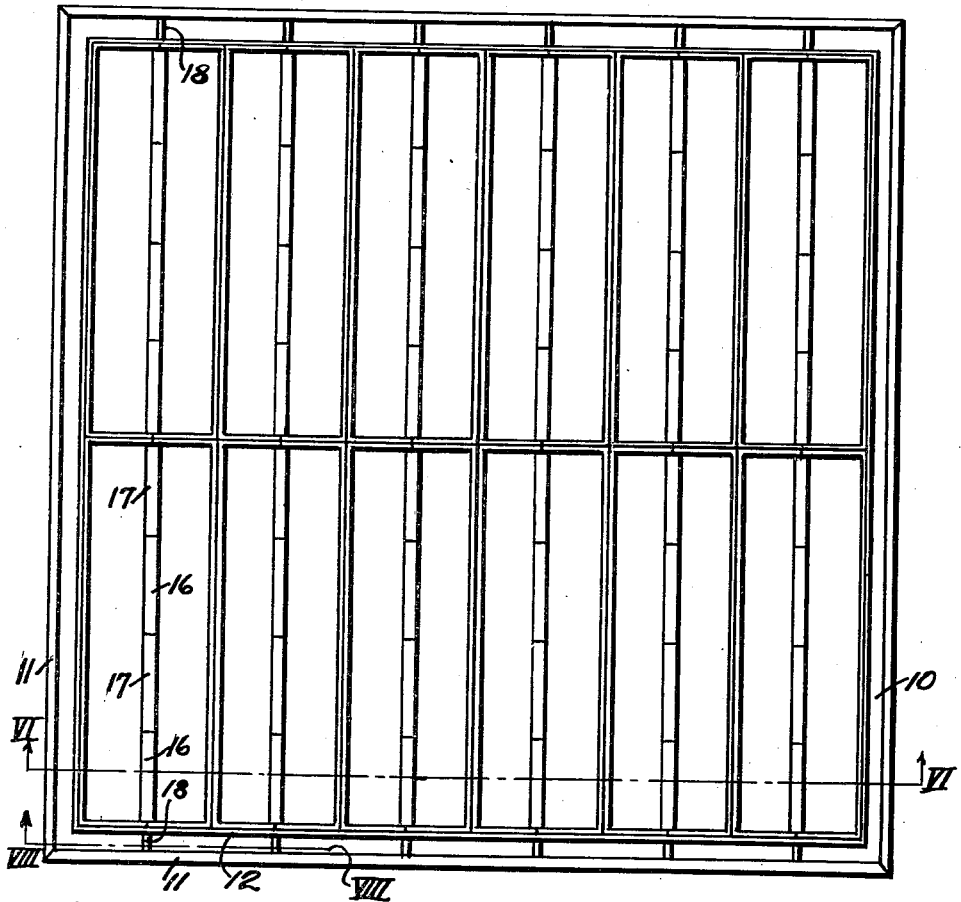
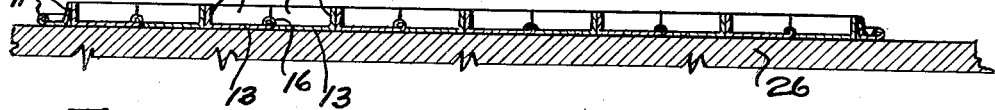
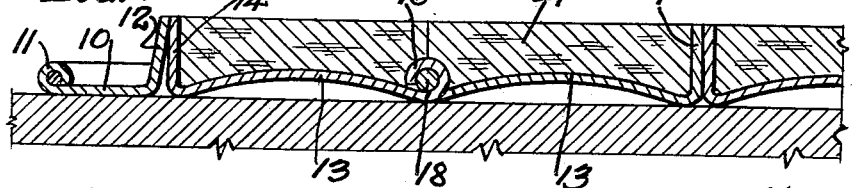
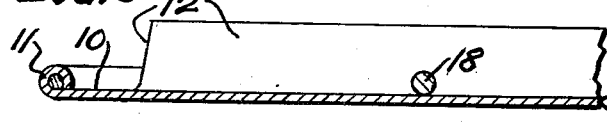
INVENTOR
CLYDE E. STAINBROOK
by J. H. Weatherford
Atty.

Patented Dec. 5, 1939

2,182,215

UNITED STATES PATENT OFFICE 2,182,215

BAKING PAN

Clyde Elmer Stainbrook, Memphis, Tenn.

Application October 21, 1937, Serial No. 170,185

8 Claims. (Cl. 53—6)

This invention relates to pans for baking elongated rolls of a type which are particularly adapted, in connection with elongated sausages, for making sandwiches popularly known as "hot dogs". It further relates to the roll made in such pan.

As is well known, certain forms of cased sausage are served by splitting an elongated bun or roll and laying the sausage therein, the cut in the roll being made along one side only, so that the opposite side serves as a hinge, the resulting sandwich being an extremely popular one, though withal quite treacherous because of the tendency of the sausage, particularly when anointed with mustard, to consistently refuse to "stay put".

The object of the present invention is to make a pan for baking a roll which will replace the split roll and yet be much better adapted to retain the sausage placed therein.

A further object is to make a unit comprising a group of such pans with a frame therefor and a holder adapted to support the pans in desired position during the preliminary step of allowing the dough, from which the rolls are to be baked, to rise, and during the subsequent baking of the rolls.

A further object is to provide, as a product of such a pan, a new and improved type of roll.

The means by which the foregoing and other objects are accomplished and the manner of their accomplishment will readily be understood from the following specification on reference to the accompanying drawings, in which:

Fig. 1 is a plan view of a unit, including a frame and a dozen pans, and the holder supporting the pans of the unit in baking position.

Fig. 2 is a section taken as on the line II—II of Fig. 1; in both of these views the pans being shown empty.

Fig. 3 is an enlarged sectional elevation taken as on the same line, showing one of the pans and fragmentary portions of the frame and supporting holder; the view showing the dough in the pan and indicating in dotted lines the general cross section of the subsequent product before removal from the pan.

Fig. 4 is a perspective view of one of the rolls.

Fig. 5 is a plan view of the pan unit in flat position, ready to receive the dough.

Fig. 6 is a sectional elevation taken as on the line VI—VI of Fig. 5, with a fragmentary portion of the supporting board or table under the pans; in both Figs. 5 and 6 the pans being shown empty.

Fig. 7 is an enlarged sectional view taken as on the line VI—VI of Fig. 5, showing one of the pans and a fragmentary portion of another pan and of the supporting board or table, the view showing dough in the pans.

Fig. 8 is a sectional elevation of a fragmentary portion of the pan frame taken as on the line VIII—VIII of Fig. 5.

Referring now to the drawings in which the various parts are indicated by numerals:

10 is a rectangular frame adapted to carry a group of pans, twelve of which are here shown, this frame, for the purpose of stiffness preferably being substantially L shaped in cross section, with a rolled and stiffened edge 11 and an upright leg 12 preferably of the same height as the depth of the pan. The pans each comprise two substantially identical halves hinged together along one of their side edges. Each pan-half has a bottom 13; one side edge 14 bent substantially vertically upward and two end edges 15, similarly bent upward. The opposite edge portions of both halves are alternately cut away or notched, and the uncut away portions 16 of one half and 17 of the other, are curled to form hinge elements which are secured together by a hinge pin 18. Preferably each pin 18 extends entirely across the unit and serves as a hinge pin for two longitudinally aligned pans. The opposite ends of the pins extend through the upright legs 12 of the ends of the frame and preferably abut the rolled edges 11, these edges being temporarily sprung downward to permit insertion of the pins.

The bottoms 13 of the pans may be flat, as shown in Figs. 1, 2, 5 and 6, but preferably are arched, as shown in Figs. 3 and 7, to correspondingly shape the inner or bottom sides of the rolls. Preferably also the upright edges of the sides of the frame are inclined inward, so that they contact the top of the side edges 14 of the adjacent pans when the latter are in flat position, yet permit downward swing of the pans to baking position.

The supporting holder preferably includes a flat base 21 having upwardly turned side edges 22 of a proper height to support the frame members 10 and allow the halves of the pans to hang below the hinge pins 18, with the bottoms 13 of the halves about at right angles to each other. Preferably the hinge members 16, 17 of these halves are so formed that they limit the downward swing of the halves to practically the same movement when the frame 10 is raised. The side edges 22 also preferably have outwardly extending flanges 23 with upwardly turned edges 24, to prevent side shifting of the frame 10. It will be understood that this holder may be made to support the ends of the frame instead of the sides, or even to support both the ends and the sides.

In using the device the unit is laid on top of a board or table 26, with the pans in flattened position; a batch of dough is placed on the pans and is rolled out to fill them level, the upper edges of the frame members 12 and the pan sides 14, and the ends 15, cutting off the surplus dough along the periphery of the pans and the abutting pan edges and pan ends cutting the dough into separate rolls. When thus rolled the dough 27 in the pans, Fig. 7, is substantially level with the top of the pans. The frame 10 is thereafter raised, the side edges of the pans sagging downward approximately as shown in Fig. 3, and the frame is placed on and supported by the sides 22 of the holder or support, the bottom of the holder leveling up unequal sagging of the pan sides. When thus positioned the dough 27 still substantially fills the pans except directly over the hinge member 16, 17, at which point it is flattened and somewhat thinned. The supported pan units are then set aside in the usual manner and the dough allowed to rise, after which they are placed in the oven and the rolls baked. After baking, the rolls comprise two connected elongated halves 30, 31, the connecting portion being thinned by the groove previously formed in the dough by the hinge members 16, 17, which halves, if the bottom of the pans are arched, are similarly arched on their under-sides, the two halves thus connected and arched, are admirably adapted to receive an elongated sausage, and when closed thereagainst to hold it in a secure manner.

During baking, the enclosure formed by the bottoms 13 of the two halves of each pan and that portion of the support bottom 21 therebeneath traps and prevents circulation of air, and, in connection with the spacing of these bottom halves, except along one edge of each, from direct transfer of heat from the support bottom, substantially prevents crisping or browning of the bottoms 29 of the resulting roll, or the formation of a bottom crust, so that in addition to their preshaping by the arch of the pan bottom, or even in the absence of such arching, the roll halves may be largely conformed to the shape of the sausage engaged therebetween, only the crispness of the top surface or crust of the roll having to be overcome, so that substantially longitudinal enclosure of the sausage may be effected. Correspondingly the product is a roll having a crust coextensive with its edge and top portions and an uncrusted bottom.

I claim:

1. A baking pan comprising two elongated complementary halves, each having a bottom, and upwardly turned edge portions along both ends and one side only, and hinge means connecting the opposite side edges of said bottoms.

2. A baking pan comprising two elongated complementary rectangular halves, each having a bottom, with upwardly turned edge portions along both ends and one side only, and hinge means connecting the opposite side edges of said bottom.

3. A pan in accordance with claim 2 in which said half bottoms are upwardly arched parallel to said hinge means.

4. A baking unit comprising a plurality of rectangular baking pans and a frame surrounding said pans; each said pan having a bottom, with sides and ends around its entire perimeter, said pan being separated into two substantially identical halves, each half of said bottom having hinge members formed along its dividing edge and a pin hingedly connecting said members, each said hinge pin extending beyond both ends of its said pan and engaging said frame for support thereby.

5. In combination, a plurality of elongated pans and a frame surrounding said pans, said pans each comprising two rectangular halves having each a bottom, upwardly turned ends and one upwardly turned side, the opposite sides of said bottoms abutting and having complementary hinge portions formed thereon and a pin engaging and hinging said hinge portions together, said hinge pin extending beyond both ends of said pan and engaging said frame to support said pans therein.

6. A baking unit comprising a plurality of rectangular baking pans and a frame surrounding said pans, said pans being assembled in said frame in longitudinally aligned pairs, each said pan having a bottom and sides and ends around its entire perimeter, said pan being separated into two substantially identical halves, each half of said bottom having hinge members formed along its dividing edge; and hinge pins, one for each said pair of pans, said pins connecting said hinge members, each said hinge pin extending beyond both its said pans and engaging said frame for support thereby.

7. In combination a plurality of elongated baking pans, a frame peripherally surrounding said pans; and a holder adapted to support said frame, said pans each comprising two rectangular halves having each a bottom, upwardly turned ends and one upwardly turned side, the opposite sides of said bottoms abutting and having complementary hinge portions formed thereon and a pin hingedly engaging said portions together, said hinge pin extending beyond the ends of said pans and engaging said frame to support said pan therein, said holder comprising a bottom and upwardly extending side flanges spaced to engage beneath opposite sides of said frame, and support said frame and the hinged edges of said pans above said holder bottoms.

8. In a baking unit, means having a bottom and supporting a plurality of shallow pans, said pans having peripheral sides and ends, and bottoms substantially at right angles in cross section, the side portions of said pans resting on, and the center portions thereof being spaced above, the bottom of said means.

CLYDE ELMER STAINBROOK.